United States Patent [19]

Hebert et al.

[11] Patent Number: 4,843,872
[45] Date of Patent: Jul. 4, 1989

[54] SUPPORT INTENDED TO MOUNT ON THE RIM AN ELEMENT USED FOR MONITORING TIRES

[75] Inventors: M. Jacques Hebert, Jouy-En-Josas; M. Gilbert Pauc, Cebazat, both of France

[73] Assignee: Compagnie Generale Des Etablissements Michelin -Michelin & Cie, Clermont-Ferrand, France

[21] Appl. No.: 190,466

[22] Filed: May 4, 1988

[30] Foreign Application Priority Data

May 7, 1987 [FR] France .................. 87 06546

[51] Int. Cl.[4] ............................................. B60C 23/02
[52] U.S. Cl. ................................... 73/146.5; 340/442
[58] Field of Search ............. 73/146.5, 146.8, 146.4, 73/146.2; 340/58

[56] References Cited

U.S. PATENT DOCUMENTS

| | | | |
|---|---|---|---|
| 3,559,155 | 1/1971 | Frey | 339/256 |
| 3,881,170 | 4/1975 | Hosaka et al. | 73/146.5 |
| 4,072,926 | 2/1978 | Shimahara et al. | 73/146.5 |
| 4,180,795 | 12/1979 | Matsuda et al. | 340/58 |
| 4,768,375 | 9/1988 | Eckardt et al. | 340/58 |

FOREIGN PATENT DOCUMENTS 3243854  5/1984  Fed. Rep. of Germany .

*Primary Examiner*—Donald O. Woodiel
*Attorney, Agent, or Firm*—Oblon, Fisher, Spivak, McClelland & Maier

[57] ABSTRACT

Support intended to receive an electric element made of one or more sensors intended to monitor the condition of a tire, and to keep the element on a rim while assuring electrical and thermal insulation relative to said rim. The support has at least two electric lines for connection to a coupling located on the outside of the pneumatic enclosure. Each electric line is formed of a length of electric wire sufficient in length to make a connection between the electric wire and terminal of the electric element, even when the electric element and support are separated. The support has a recess in which the excess length of electric wire is spontaneously housed when the element is brought into mounting position on the support.

4 Claims, 2 Drawing Sheets

SUPPORT INTENDED TO MOUNT ON THE RIM AN ELEMENT USED FOR MONITORING TIRES

BACKGROUND OF THE INVENTION

1. Field of the Invention

This invention relates to monitoring tires. In particular, it relates to a support for fastening on a rim certain elements necessary for such monitoring.

2. Background of the Related Art

In most devices for monitoring tires there are one or more sensors, optionally associated with electronic components, positioned in the annular pneumatic enclosure defined by the tire and wheel and sensitive to conditions prevailing inside the enclosure, such as pressure or temperature. In this application, this sensor and/or these components are generally designated as an "electric element". Also on the outside of the pneumatic enclosure are means to provide the electrical connection or coupling of the electric element to the vehicle, for example, a coil if inductive coupling is used, or else other suitable means.

Electric connections must also be made between the electric element and the coupling means. While the electric element should be kept quite immobile relative to the rim, a good thermal insulation of the electric element must also be provided. Also a reliable electric connection must be obtained for the electric elements with the electric lines joining to the coupling means; most often this requires resorting to soldering. The miniaturized electric element contains all the necessary electric and/or electronic elements and upon mounting, could not support too high temperatures or too much heat.

SUMMARY OF THE INVENTION

The object of the invention is to provide a support that can accommodate the above requirements and receive a separately formed electric element.

The support according to the invention is intended to receive an electric element having one or more sensors intended to monitor the condition of a tire and keep said electric element on the rim, while assuring sealing, and electrical and thermal insulation relative to said rim. The support incorporates at least two electric lines for connection of the electric element to the coupling means located outside of the pneumatic enclosure. Each electric line is formed of a length of electric wire sufficient in length to maintain a connection between said electric wire and a terminal of said electric element, even when said element and support are moved aside. The support defines a recess in which the excess length of electric wire is automatically housed when the electric element is brought into mounting position on the support.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
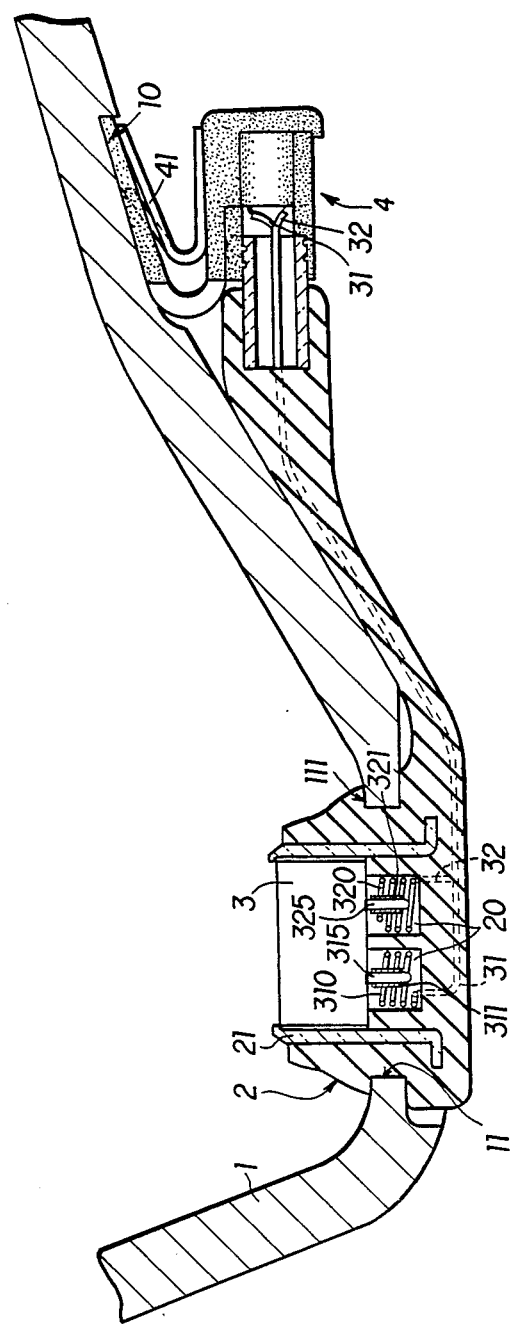
FIG. 1 shows the support according to the invention, the electric element for monitoring the tire and the coupling antenna installed on a rim.

FIG. 1 partially shows a rim 1 in whose drop center a support 2 is sealingly installed by connecting means 111. A bore 11 is made for this purpose. This support 2 holds an electric element 3 and provides the electric connection of the latter to an antenna 4 fastened on the radially inside face of rim 1, and so at a position on the outside of the pneumatic enclosure and, in the case illustrated, toward the inside of the vehicle relative to the wheel axis.

Antenna 4 is a coil generally coaxial to rim 1. It is kept in place by clips 41 engaging in a groove 10 provided for this purpose on the radially inside face of rim 1. Two electric wires 31 and 32 connect antenna 4 to electric element 3. The latter is in the form of a capsule holding all the elements which should be provided in the pneumatic enclosure to monitor it. By way of example, they can be circuits such as described in PCT Patent Applications Nos. WO87/00127 and WO87/00129, in the form of integrated and/or hybrid circuits making considerable miniaturization possible. They can also be simpler components of the manometric switch type. The support 2 therefore is designed to hold an electric element 3 in the form of a capsule form which at least two terminals 315, 325 project. The number of terminals, of course, depends on the type of circuit or component(s) present in electric element 3.

Support 2 is in the form of a base forming a seal, made of a material able to provide the required electric and especially thermal insulation relative to rim 1, while having sufficient mechanical strength properties to securely retain electric element 3, even while stressed by the internal inflation pressure, by the centrifugal force due to the rotation of the tire and by all accelerations arising due to impacts produced during driving. For example, rubber may be used as the material. From a thermal viewpoint and quite particularly if it is desired to measure the temperature prevailing inside the tire, it is important that electric element 3 be insulated from rim 1 which otherwise could falsify the temperature measurement downward (when starting) or most often upward (due to heat released by the brakes). Here the base is reinforced by an annular metal insert 21.

Figure 3:
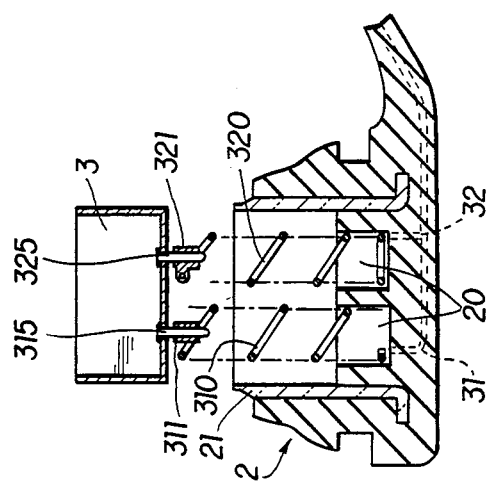
FIG. 3 shows the relative position of the support and of the electric element at a mounting stage.
Figure 2:
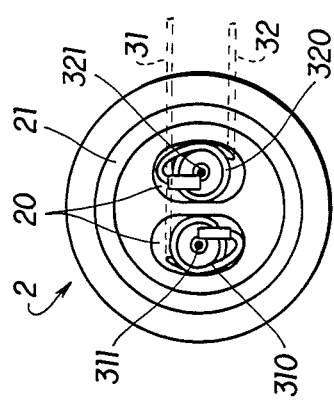
FIG. 2 is a plan view of a portion of the support.

To provide the electric connection between support 2 and electric element 3, each electric line (31, 32) is formed by a length of electric wire sufficient to allow connection to the electric element 3, preferably by soldering, when support 2 and element 3 are moved aside from one another as in the configuration shown in FIG. 3. The electric wires should be formed such that when the electric element is subsequently brought to its mounting position on support 2, each wire is automatically housed in one recess 20 made for this purpose in support 2. For this purpose, the end of each wire 31, 32 constitutes a spring 310, 320. Preferably, each spring is positioned entirely in one said recess, when unstressed, and ends in a female type connecting part 311, 321, receiving a terminal 315, 325 of said element 3 to make a temporary connection. This makes it possible to remove the connection thus made to the outside of the support to perform the soldering. The springs extend at this time to maintain the temporary connection as shown in FIG. 3.

Support 2 makes it possible to provide the required electric connection and sealing, while allowing support 2 and electric element 3 to be formed separately so as not to subject the latter to considerable thermal stresses. Support 2 therefore makes it possible to avoid resorting to in-molding of a seal on electric element 3.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A support for receiving an electric element comprising at least one sensor for monitoring a condition of a tire, said support comprising:
   means for holding an electric element in communication with a pneumatic enclosure defined by a tire and a wheel and for sealingly connecting said support to a rim of the wheel;
   means for supporting coupling means outside of the enclosure;
   at least one wire connected between the electric element and the coupling means; and
   means for maintaining the connection between the electric element and the at least one wire when the electric element is moved aside from said holding means, said maintaining means comprising an excess length of said at least one wire sufficient to maintain connection between said electric element and the at least one wire when the electric element is moved aside from said holding means, and a recess in said holding means for each said at least one wire, whereby each said at least one wire is housed in one said recess when said electric element is held in said holding means.

2. The support of claim 1, wherein said excess length of each said at least one wire comprises a spring positioned in said recess when in an unstressed state.

3. The support of claim 2, including a female connector on each said spring for connecting to a male terminal of the electric element.

4. The support of claim 1, including two of said wires.

* * * * *